United States Patent
Tam et al.

(10) Patent No.: US 7,561,878 B2
(45) Date of Patent: Jul. 14, 2009

(54) MOBILE HANDSET CALL TESTING SYSTEM AND METHOD

(75) Inventors: Wilson Tam, Markham (CA); Jaeho Chong, Scarborough (CA)

(73) Assignee: Rogers Wireless Partnership, Toronto (CA)

(*) Notice: Subject to any disclaimer, the term of this patent is extended or adjusted under 35 U.S.C. 154(b) by 379 days.

(21) Appl. No.: 11/245,637

(22) Filed: Oct. 6, 2005

(65) Prior Publication Data

US 2007/0082663 A1   Apr. 12, 2007

(51) Int. Cl.
*H04W 24/00* (2009.01)
*H04B 17/00* (2006.01)

(52) U.S. Cl. .............. 455/425; 455/423; 455/67.11; 455/67.14; 455/67.7; 370/241; 370/242; 379/1.01

(58) Field of Classification Search ......... 455/423–425, 455/67, 67.11–67.7; 370/241–245; 379/1.01–35
See application file for complete search history.

(56) References Cited

U.S. PATENT DOCUMENTS

| | | | |
|---|---|---|---|
| 5,031,204 A | 7/1991 | McKernan | |
| 5,425,076 A | 6/1995 | Knippelmier | |
| 5,504,800 A | 4/1996 | Yehushua et al. | |
| 5,764,726 A | 6/1998 | Selig et al. | |
| 5,926,762 A * | 7/1999 | Arpee et al. | 455/447 |
| 5,933,776 A | 8/1999 | Kirkpatrick | |
| 6,346,883 B1 | 2/2002 | Huang et al. | |
| 6,587,671 B1 | 7/2003 | Kanago et al. | |
| 6,662,009 B2 | 12/2003 | Lynn | |
| 6,970,702 B1 * | 11/2005 | Martin | 455/424 |
| 7,171,157 B2 * | 1/2007 | Lee | 455/424 |
| 7,206,573 B1 * | 4/2007 | Weaver et al. | 455/423 |
| 2002/0137505 A1 * | 9/2002 | Eiche et al. | 455/425 |
| 2002/0183054 A1 * | 12/2002 | Rimoni et al. | 455/423 |
| 2003/0039345 A1 * | 2/2003 | Yang et al. | 379/201.01 |
| 2003/0081735 A1 * | 5/2003 | Emory et al. | 379/1.01 |
| 2003/0202639 A1 | 10/2003 | Chan | |

* cited by examiner

*Primary Examiner*—Lester Kincaid
*Assistant Examiner*—Daniel Lai
(74) *Attorney, Agent, or Firm*—Steven M. Jensen; Edwards Angell Palmer & Dodge LLP (57) ABSTRACT

A mobile handset call testing system and method. Mobile wireless handsets are tested under the control of a controller. The controller causes an autodialler to dial a call request on a transmitting handset. The call request is received by a wireless network and communicated to a receiving handset. RF sensors at the transmitting and receiving handsets provide the controller with signals indicative of the RF transmissions emanating from the handsets. The controller determines whether the outgoing call request and/or the incoming call request are successful based upon the detected RF transmissions.

15 Claims, 6 Drawing Sheets

MOBILE HANDSET CALL TESTING SYSTEM AND METHOD

FIELD OF THE APPLICATION

The present invention relates to mobile wireless devices and, in particular, to a method and system for testing such devices in a live wireless network environment.

BACKGROUND

Mobile communication handset vendors perform a battery of laboratory tests upon their products prior to release and shipment of the handsets. These tests are performed under closed laboratory conditions in order to confirm the handsets operate as expected and to test the air interface and ensure it meets the relevant standards and is capable of conforming to the relevant communications protocol(s).

Despite this, mobile communication network operators still need to perform in-field testing of the handsets to ensure they meet performance and quality criteria over a live wireless network. One of the relevant tests is termed "call testing" and it involves an assessment of the handset's ability to initiate a call request and/or receive an incoming call request.

Actual call testing of handsets over a live network is a labour-intensive task, since it typically requires that a user like a radio engineer or RF technician manually dial an outgoing call from the handset to a landline telephone set. If the landline telephone set rings, the outgoing call request is successful. For an incoming call test, the user manually dials a call from the landline telephone set to the handset. If the handset rings, then the incoming call request is successful.

Each cycle may take 30 seconds. Often, it is desirable to perform the test cycle up to 1000 times to gather sufficient data regarding the handset performance. This means that the user must often manually perform testing on a handset for up to 8 hours. With test times of this duration it may be difficult to avoid performing a test during peak operating hours when it is desirable to maintain full availability of channels for the network operator's customers.

In order to reduce the impact of network variables, a candidate handset is often tested against a benchmark handset. In operation, this means that an outgoing or incoming call is performed concurrently with a benchmark handset alongside the candidate handset. Accordingly, the user sits at a desk with two landline phones and with the candidate handset in one hand and the benchmark handset in the other hand in order to perform call testing. Outgoing calls to the landline telephones are placed concurrently on the benchmark handset and the candidate handset. Similarly, incoming calls are concurrently placed to the candidate handset and the benchmark handset using the landline telephones. The ratio of successes and failures is tracked for the candidate and benchmark handsets and is used to assess the performance of the candidate handset.

The existing test systems' reliance upon manual operation results in an inability to confirm timing parameters and a limit on the number of handsets that may be tested at one time by an operator. The system is also disadvantageous in that the test is performed at a fixed location within a single cell site so it cannot test handoff capabilities.

It would be advantageous to provide an improved method and system for performing testing upon wireless mobile devices.

BRIEF SUMMARY

The present application provides an automated test system and method for evaluating mobile wireless devices. The system uses an autodialler to initiate call requests on a candidate handset. The system determines whether a call request is successful by detecting RF transmissions from the handset. The call request is placed to a second candidate handset and RF transmissions from the second candidate handset are used to determine whether the call request has been successfully received.

In one aspect, the present application provides a system for testing wireless mobile devices. One of the wireless mobile devices is designated a transmitting device and the other wireless mobile device is designated a receiving device. The wireless mobile devices communicate via a wireless network using a wireless communication protocol. The system includes an autodialer connected to the transmitting device for causing the transmitting device to initiate a call request to the receiving device through the wireless network. It also includes a first sensor for sensing RF signals emanating from the transmitting device and a second sensor for sensing RF signals emanating from the receiving device. The first sensor has an output port for providing a first signal based upon the RF signals sensed from the transmitting device and the second sensor has an output port for providing a second signal based upon the RF signals sensed from the receiving device. The system also includes a controller for controlling operation of the autodialler and coupled to the output ports of the first sensor and the second sensor to receive the first signal and the second signal. The controller includes a test module for determining whether the call request is received by the receiving device through the wireless network.

In another aspect, the present application provides a method of testing wireless mobile devices. One of the wireless mobile devices is designated a transmitting device and the other wireless mobile device is designated a receiving device. The wireless mobile devices communicate via a wireless network using a wireless communication protocol. The method includes the steps of initiating a call request from the transmitting device to the receiving device through the wireless network, detecting first RF signals emanating from the transmitting device, detecting second RF signals emanating from the receiving device, and determining from the first RF signals whether the call request is transmitted by the transmitting device and determining from the second RF signals whether the call request is received by the receiving device through the wireless network.

In yet another aspect, the present application provides a test system for testing wireless mobile devices. One of the wireless mobile devices is designated a transmitting device and the other wireless mobile device is designated a receiving device. The wireless mobile devices communicate via a wireless network using a wireless communication protocol. The system includes means for initiating a call request from the transmitting device to the receiving device through the wireless network, means for detecting first RF signals emanating from the transmitting device, means for detecting second RF signals emanating from the receiving device, and means for determining from the first RF signals whether the call request is transmitted by the transmitting device and for determining from the second RF signals whether the call request is received by the receiving device through the wireless network.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

Some of the example embodiments described below may refer to the testing of wireless devices and, in particular, analog or digital cellular telephones. It will be appreciated that references in this application to wireless devices are intended to encompass a wide range of mobile devices capable of placing a voice call to another remote device through a wireless network using a wireless communication protocol. Accordingly, the terms "wireless device" and "handset" include cellular telephones, personal communication services (PCS) devices, and, in some circumstances, wireless-enabled personal digital assistants (PDAs), or any other such device.

Figure 1:
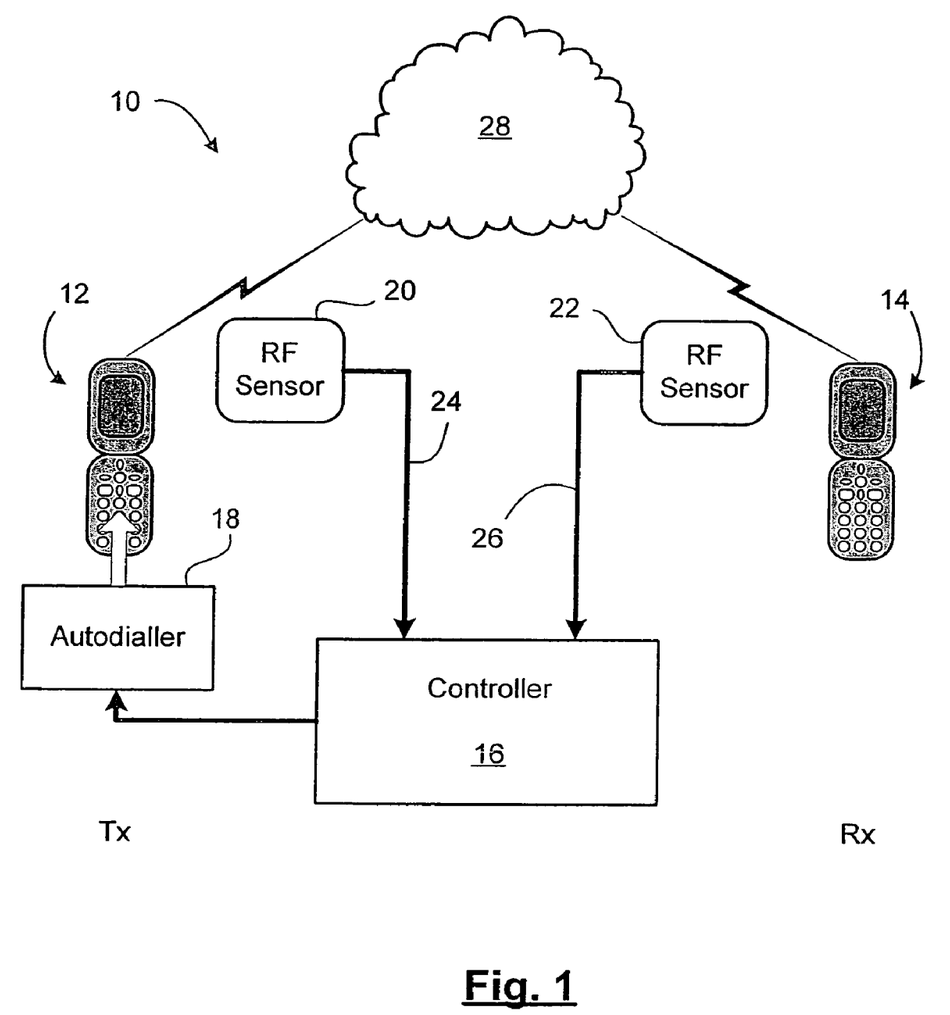
FIG. 1 shows a block diagram of an embodiment of a test system for testing wireless devices.

Reference is first made to FIG. 1, which shows a block diagram of an embodiment of a test system 10 for testing wireless devices. In this embodiment, the test system 10 is configured to test two wireless devices and, in particular, two mobile telephone handsets. For the purposes of testing the handsets, one of the handsets is designated to perform transmission of calls and is referred to as the test transmit handset 12; the other handset is designated to perform reception of calls and is referred to as the test receive handset 14. The two handsets 12, 14 may be the same make, model and manufacturer, but they need not be; in other words, the test system 10 may evaluate the transmission and reception capabilities of one type of handset at a time, or it may evaluate the transmission capabilities of one type of handset and the reception capabilities of another.

The handsets 12, 14 are enabled for RF communication with a wireless network 28. The wireless network 28 includes one or more basestations and/or repeaters for communicating with mobile handsets using a predefined wireless communications protocol. For example, the wireless network may be a voice and/or data network such as the Global System for Mobile Communication (GSM), Code Division Multiple Access (CDMA), or various third-generation networks, like Enhanced Data rates for GSM Evolution (EDGE) or Universal Mobile Telecommunications Systems (UMTS). In some embodiments, the wireless network 28 may include a wireless LAN operating in accordance with IEEE 802.11 protocols and enabling VoIP service.

The test system 10 includes a controller 16, an autodialler 18, a first RF sensor 20 and a second RF sensor 22. The autodialler 18 is connected to and operates under the control of the controller 16. The RF sensors 20 and 22 detect RF signals and convert detected signals into electrical signals. The RF sensors 20 and 22 each output an analog signal having a voltage and/or current with a magnitude based upon the detected RF signal level.

The first RF sensor 20 is positioned proximate the test transmit handset 12 so as to sense RF signals emanating from the test transmit handset 12. Accordingly, the first RF sensor 20 outputs an analog electrical signal that may be referred to as a first signal 24. The first signal 24 is input to the controller 16.

The second RF sensor 22 is positioned proximate the test receive handset 14 so as to sense RF signals emanating from the test receive handset 14. Accordingly, the second RF sensor 22 outputs an analog electrical signal that may be referred to as a second signal 26. The second signal 26 is input to the controller 16.

The handsets 12, 14 and sensors 20, 22 may be positioned such that each handset/sensor pair is relatively isolated from the other, thereby avoiding RF interference. In other words, each sensor will detect the RF emanating from its associated handset without significant RF interference from emissions of the other handset. In many cases spatial separation and the establishment of appropriate thresholds for detection may be sufficient to achieve isolation. In other cases, some form of physical isolation may be created using a physical barrier to attenuate RF signals propagating from one handset to the RF sensor associated with the other handset.

The autodialler 18 is connected to the test transmit handset 12. The autodialler 18 is configured to dial the test transmit handset 12 so as to cause it to communicate with the wireless network 28 and initiate a call to the test receive handset 14 in accordance with the communications protocol. In the present embodiment, the autodialler 18 physically contacts the keys or buttons on the test transmit handset 12 in order to cause it to initiate a call. In some embodiments, the autodialler 18 may be electrically connected to the test transmit handset 12 such that it electrically triggers the test transmit handset 12 to initiate a call. Such an embodiment may require that the cover plate on the handset be opened and appropriate electrical connections be made with the electronics inside the handset. To simulate real-world user operation of the handset, the present embodiment of the test system 10 uses a physical autodialler 18.

The controller 16 may include a processor, an analog-to-digital converter, and various drivers and other components for implementing the controller functions, as will be described below. In some embodiments, the controller 16 may be implemented by way of a microcontroller, microprocessor, application specific integrated circuit, discrete components, and/or a combination thereof. In some embodiments, the controller 16 may be implemented by way of a suitably programmed personal computer with appropriate I/O cards for receiving the analog sensor signals and outputting the appropriate drive signals, as will be described further below. Those of ordinary skill in the art will appreciate that many embodiments, such as those including microcontrollers, microprocessors, etc., will operate under stored program control. The suitable programming of such devices to perform the functions described herein will be within the skill of such persons, having regard to the present description.

The controller 16 includes a user interface and a user input device. The user interface may include a display screen, LCD panel, or other such device. The user input device may include a keypad, keyboard, mouse, and/or other such devices. Using the user interface and user input device, a user of the test system 10 may initiate a test sequence and set various parameters. The user may also interrupt, pause, and cancel the test sequence, and otherwise control the test system 10.

In operation, the user positions the handsets 12, 14 for testing. In particular, the test transmit handset 12 is positioned within the autodialler 18. In the present embodiment, the autodialler 18 includes a jig for holding the test transmit handset 12 in place. The autodialler 18 also includes adjustable actuators for pressing the SEND and END keys upon the test transmit handset 12 to cause the test transmit handset 12 to initiate a call and end a call, respectively. The position of the adjustable actuators may be fine-tuned by the user to ensure that correct contact is made with the correct keys of the particular test transmit handset 12. Through the autodialler 18 and/or the controller 16 the user may also adjust the length of time that the autodialler 18 depresses the keys to obtain the desired function. The test receive handset 14 and the RF sensors 20, 22 are positioned so as to achieve the isolation discussed above. In one embodiment, the test receive handset 14 and second RF sensor 22 are placed behind or within an RF isolation shield.

The user ensures the test transmit handset 12 is in an active phone mode of operation and enters the phone number of the test receive handset 14 into the test transmit handset 12. The user may then manually initiate a call so as to ensure that the number has been entered correctly and that the test receive handset 14 may be reached through the wireless communication network 28.

Once the initial set-up is complete, and the user has selected appropriate parameters for the test (as will be discussed further below), the user may initiate the test sequence using the controller 16.

During the test sequence, the controller 16 causes the autodialler 18 to depress the SEND key to initiate a call to the test receive handset 14. The test transmit handset 12 engages in a paging and registration protocol with the wireless communication network 28 as a part of the call request procedure. During this procedure, the test transmit handset 12 propagates RF signals to a remote basestation within the wireless communication network 28. The first RF sensor 20 detects these signals and its output first signal 24 reflects the magnitude of the detected RF signals. For example, the RF signals may be converted to electrical signals having a voltage magnitude reflective of the magnitude of the EM field produced by the test transmit handset 12. Obviously, the directionality of the antennae within the test transmit handset 12 and the first RF sensor 20, and their relative orientation to and spacing with each other will affect the magnitude of the RF signals sensed by the first RF sensor 20. However, the threshold for detection of an RF transmission may be established such that the spacing and orientation is not significant in terms of distinguishing active RF transmissions from the absence of RF transmissions. This threshold may be set within the controller 16, as will be explained further below. Accordingly, in some embodiments, the controller 16 detects the presence of RF signals by periodically sampling the signals from the RF sensors 20, 22 and determining whether they indicate an RF transmission or not. In some embodiments, the controller 16 samples the RF sensor data at a predefined sampling rate, which in one embodiment is about 10 milliseconds.

The wireless communications network 28 performs its functions in accordance with the wireless communications protocol to locate and page the test receive handset 14 so as to notify it of the call request. This notification procedure may involve a number of RF transmission between the test receive handset 14 and the remote basestation within the wireless communications network 28. The precise number and content of the transmissions may vary depending upon the protocol and type of network. If the call request is successful in reaching the test receive handset 14, the test receive handset 14 will ring, or vibrate, or otherwise alert its user to the incoming call request. In the test system 10, the second RF sensor 22 is used to detect the RF transmissions between the test receive handset 14 and the wireless communications network 28. The presence of the detected RF signals emanating from the wireless handset 14 is reflected in the second signal 26 input to the controller.

The controller 16 receives the first signal 24 from the first RF sensor 20 and the second signal 26 from the second RF sensor 22, and determines whether the outgoing and incoming call request have been successful. In particular, based upon the first signal 24, the controller 16 determines whether the test transmit handset 12 has initiated a call request in response to actuation by the autodialler 18. Based upon the second signal 26, the controller 16 determines whether the test receive handset 14 has been notified of the incoming call by the wireless communications network 28. If the controller 16 determines that both of these events have occurred, as indicated by the detected RF signals, then the controller 16 determines that the call initiation and reception is a success.

In some embodiments, the controller 16 also determines success on the basis of the call initiation and/or reception occurring within a predefined timing window. If it takes too long for the call to be initiated or received, then the call may be deemed a failure. In some embodiments, the timing window may be modified by the user of the test system 10.

The controller 16 then causes the test transmit handset 12 to terminate its call request. In particular, the controller 16 causes the autodialler 18 to actuate the END button on the test transmit handset 12. After a period of time, the controller 16 verifies that both handsets 12, 14 are idle by confirming that no RF signals are detected by the RF sensors 20, 22. Once the handsets 12, 14 are confirmed to be idle, then the test sequence begins anew with another call request.

The controller 16 continues to cycle through the test sequence for as many iterations as may have been selected by the user. The controller 16 tracks the success rate in call initiation and call reception. The data regarding the success rate may be stored in memory within the controller 16 and/or output through a data port, such as a serial port.

Figure 2:
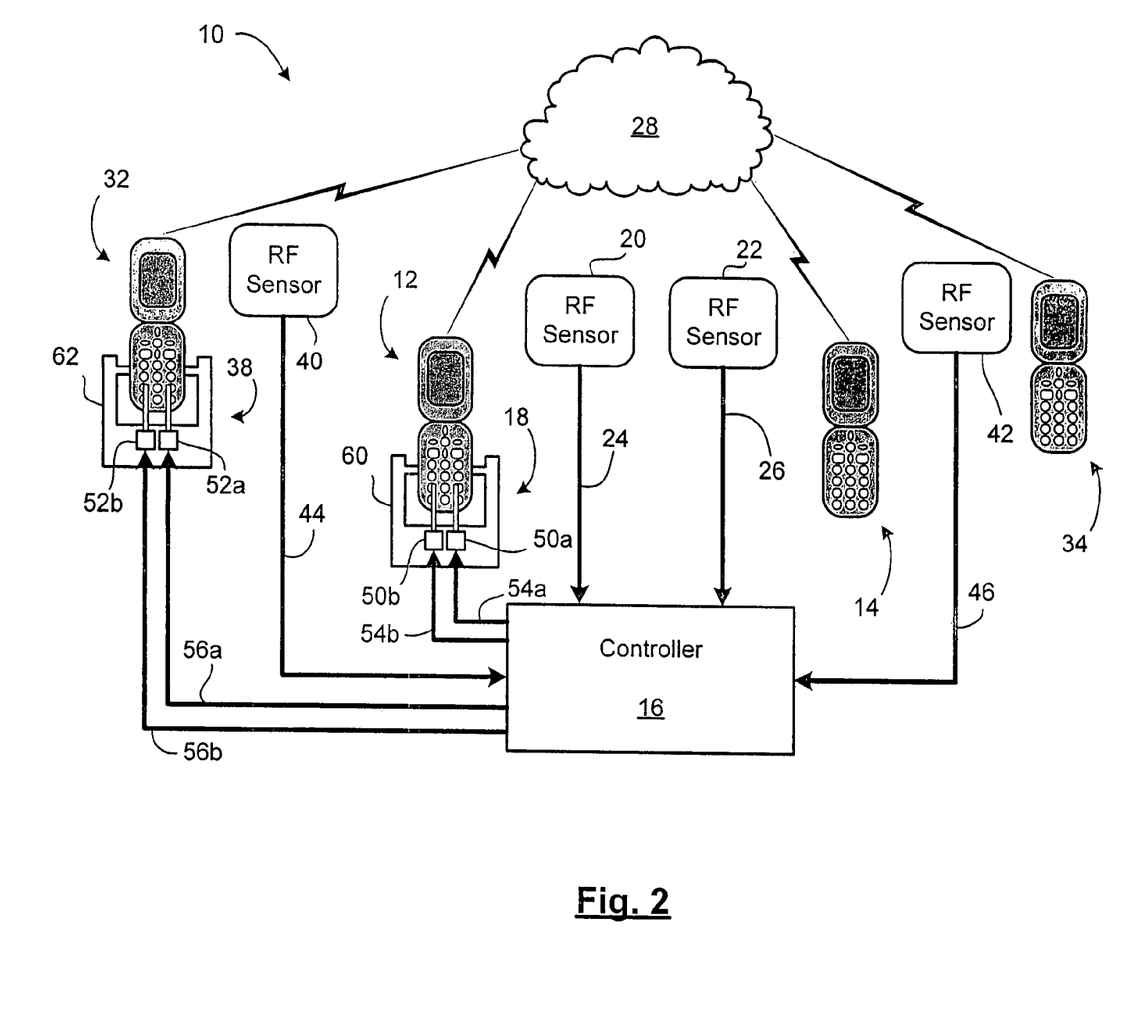
FIG. 2 shows a block diagram of a further embodiment of the test system.

Reference is now made to FIG. 2, which shows a block diagram of a further embodiment of the test system 10.

It will be appreciated that it may be desirable to measure the performance of one or more phones-under-test against a benchmark handset. Accordingly, in this embodiment the test system 10 includes an benchmark autodialler 38 and first and second benchmark RF sensors 40, 42 in order to test a benchmark transmit handset 32 and a benchmark receive handset 34.

In parallel with the testing of the test transmit handset 12 and test receive handset 14, the controller 16 performs the same test sequence with the benchmark handsets 32, 34. In other words, the test transmit handset 12 and the benchmark transmit handset 32 are each actuated by their respective autodiallers 18, 38 so as to place a call request to the test receive handset 14 and the benchmark receive handset 34, respectively. The benchmark RF sensors 40, 42 provide first benchmark and second benchmark signals 44, 46, respectively, to the controller 16. The controller 16 may then track the success and failure rates of the benchmark handsets 32, 34 concurrently with its tracking of the success and failure rates of the transmitting and receiving handsets 12, 14.

In this embodiment, the test autodialler 18 and the benchmark autodialler 38 each include a pair of servos for physically actuating the SEND and END buttons on the test transmit handset 12 and the benchmark transmit handset 32, respectively. In particular, the test autodialler 18 includes a first SEND servo 50a and a first END servo 50b. The first servos 50a, 50b are mounted to a jig 60 which includes a clamp for retaining the test transmit handset 12 in a fixed position. The first SEND servo 50a and the first END servo 50b each cause a corresponding actuator to press a button on the test transmit handset 12. It will be appreciated that there are many mechanical linkages, including screws and cams, for converting the motive force of the servos 50a, 50b into the desired motion of the actuator. For ease of illustration, no such linkage is shown in FIG. 2; however, those of ordinary skill in the art will appreciate the range of possible embodiments.

The first servos 50a, 50b and/or their actuators are independently adjustably mounted to the jig 60 such that the user may adjust the positioning of the first servos 50a, 50b to ensure that they contact the correct SEND and END buttons on the test transmit handset 12 with the appropriate force. Different handsets will have different physical layouts, so it may be necessary to readjust the positioning of the servo/actuators for each new type of handset under test.

The benchmark autodialler 38 similarly includes a benchmark jig 62, a second SEND servo 52a, and a second END servo 52b.

The first and second servos 50a, 50b, 52a, 52b operate under the control of the controller 16. In particular, the controller 16 outputs servo drive signals 54a and 54b to control the first SEND servo 50a and first END servo 50b, respectively. It also outputs servo drive signals 56a and 56b to control the second SEND servo 52a and second END servo 52b, respectively.

Although the system 10 is shown in this embodiment with a pair of handsets under test and a pair of benchmark handsets, it will be appreciated that the system 10 may include capacity to test additional handsets at the same time. Additional RF sensors and autodiallers may be provided to accommodate additional candidate handsets for concurrent testing.

In one embodiment, the handsets under-test and/or the benchmark handsets may include an antenna port. The antenna port allows for a physical connection to the handset to tap antenna signals. Accordingly, the RF sensor, in some embodiments, may not include an over-the-air RF sensor, but instead may include a direct coaxial connection to the antenna port of a handset to receive RF signals emanating from the handset. It will be appreciated that the phrase "sensor for sensing RF signals" used herein is intended to include both over-the-air RF sensing and antenna port RF sensing.

Figure 3:
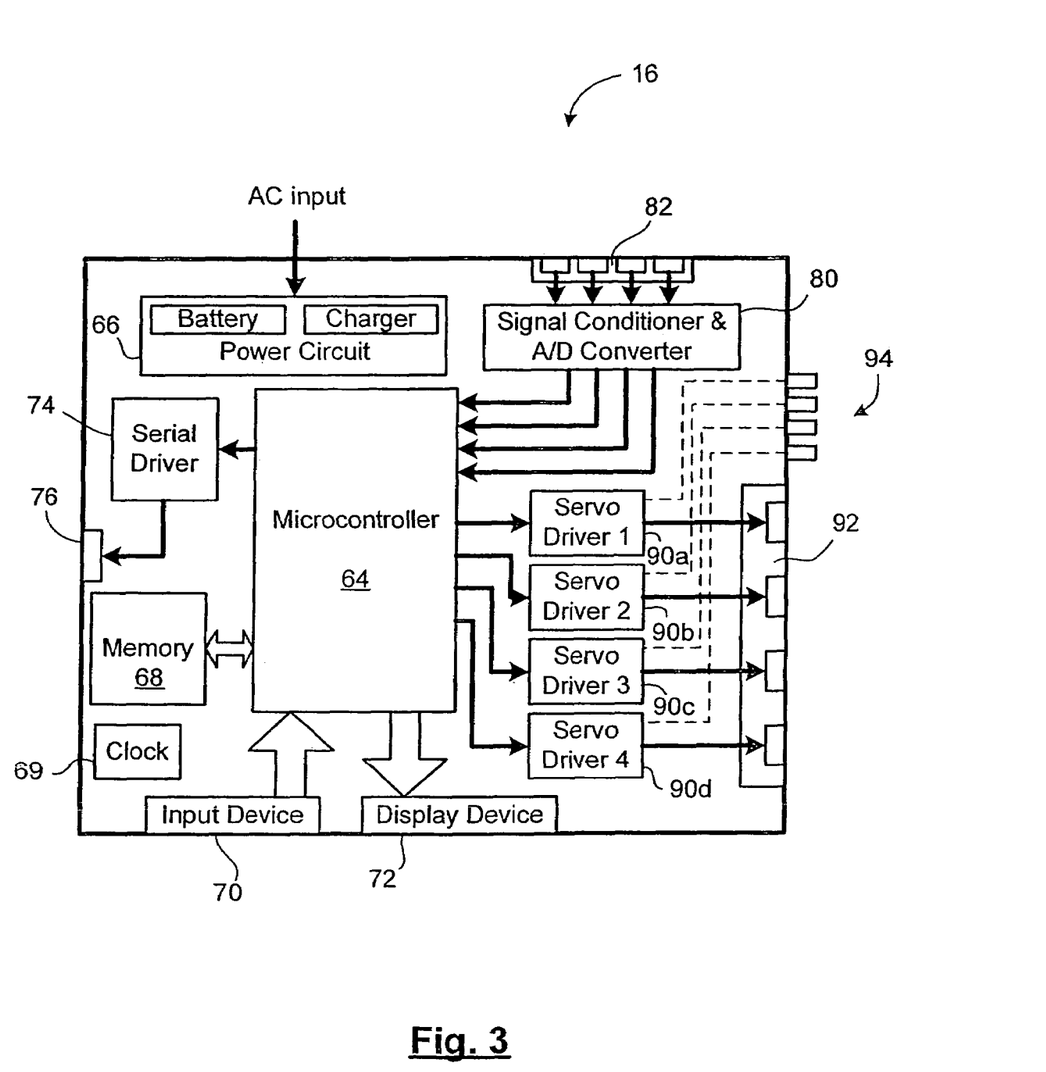
FIG. 3 shows, in block diagram form, an embodiment of a controller for use in the test system.

Reference is now made to FIG. 3, which shows, in block diagram form, an embodiment of the controller 16.

The controller 16, according to this embodiment, includes a microcontroller 64, a power circuit 66 for supplying DC power to the microcontroller 64 and various other components, and memory 68 accessible to the microcontroller 64. Those skilled in the art will recognize that the memory 68 may be integrally contained within the microcontroller 64 and/or separate from the microcontroller 64. The memory 68 may store program code instructions for configuring the microcontroller 64 to execute the test sequence described herein. The controller 16 may also include a clock circuit 69, which may include one or more oscillators and related devices for generating clock signals.

The power circuit 66 may receive power from an external AC source. It may also include a battery and battery charger for supplying power to the controller 16 in the absence of the external AC source. The battery and battery charger provide the controller 16 and, consequently, the test system 10 (FIG. 1) with portability. This may, in some embodiments, allow the test system 10 to operate in a mobile environment so as to test handsets during handoff when moving between cell sites/basestations.

The controller 16 includes user input device 70 and a display device 72. In one embodiment the user input device 70 includes a plurality of buttons for navigating menus and selecting items or inputting data. The display device 72, in one embodiment, may include a two-line LCD output screen and a set of LED indicator lights. Other types of input and output devices may be used to facilitate interaction with a user.

The controller 16 may also include a serial driver 74 and serial I/O port 76. In one embodiment, the serial I/O port 76 comprises a port conforming to the RS-232 standard. The serial driver 74 and serial I/O port 76 allow the controller 16 to transmit data regarding the test or test results to a remote personal computer or personal digital assistant (PDA).

The controller 16 includes signal conditioning and A/D circuitry 80. The signal conditioning and A/D circuitry 80 is connected to input ports 82, which receive input analog signals from the RF sensors. The signal conditioning and A/D circuitry 80 applies appropriate filtering to the input signals and converts the analog signals into digital signals which are input to the microcontroller 64 for analysis. The signal conditioning and A/D circuitry 80 may be implemented using discrete or integrated components or a combination thereof.

The controller 16 also includes a set of servo drivers 90 (shown individually as 90a, 90b, 90c, and 90d). The servo drivers 90 output drive signals through output ports 92 to the servos 50a, 50b, 52a, 52b (FIG. 2). The servo drivers 90 operate in response to control signals output by the microcontroller 64. In one embodiment, the servo drivers 90 may also be manually activated by way of user control knobs 94.

Figure 4:
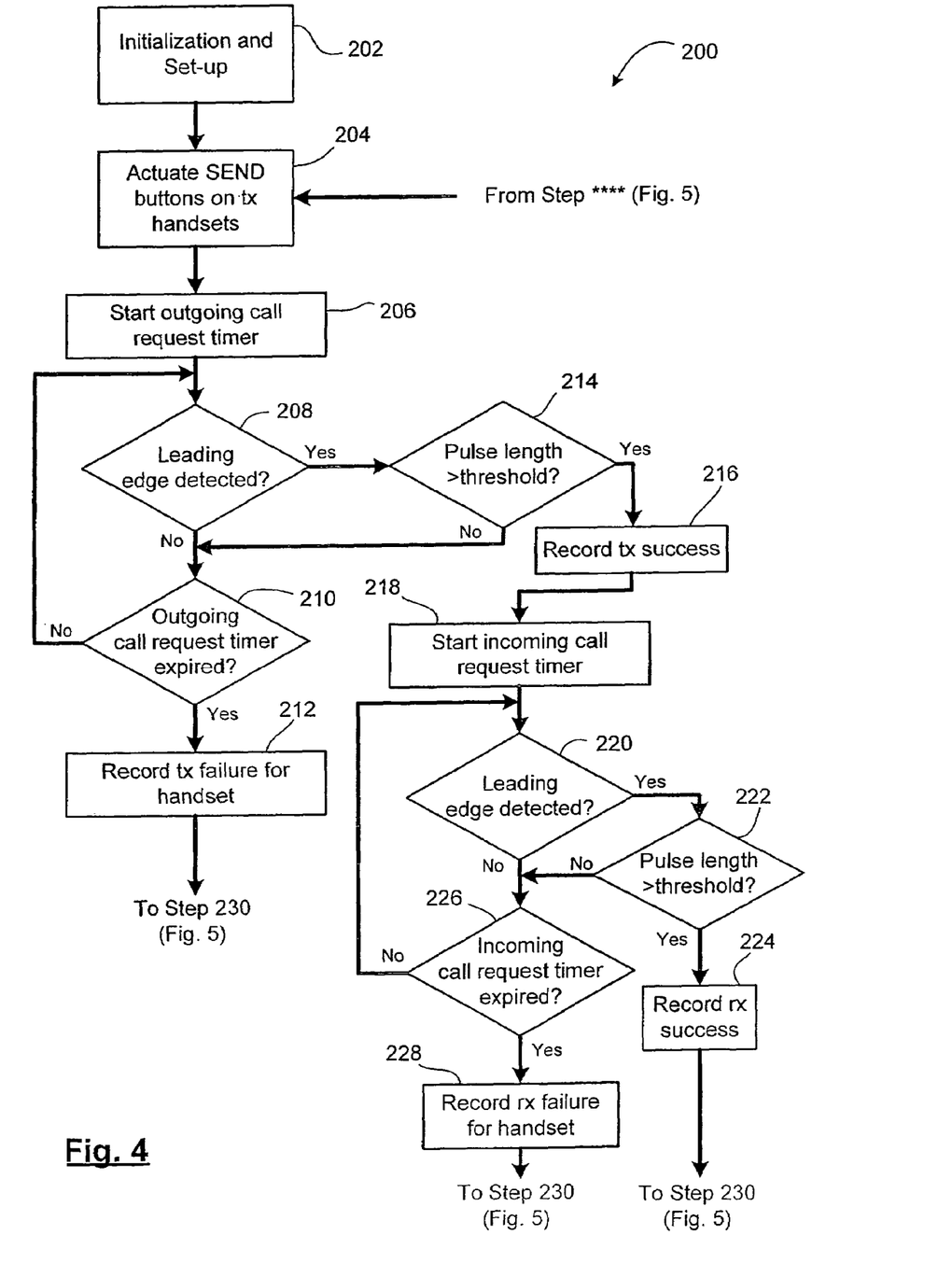
FIGS. 4 and 5 show, in flowchart form, an embodiment of a method for testing wireless handsets.
Figure 5:
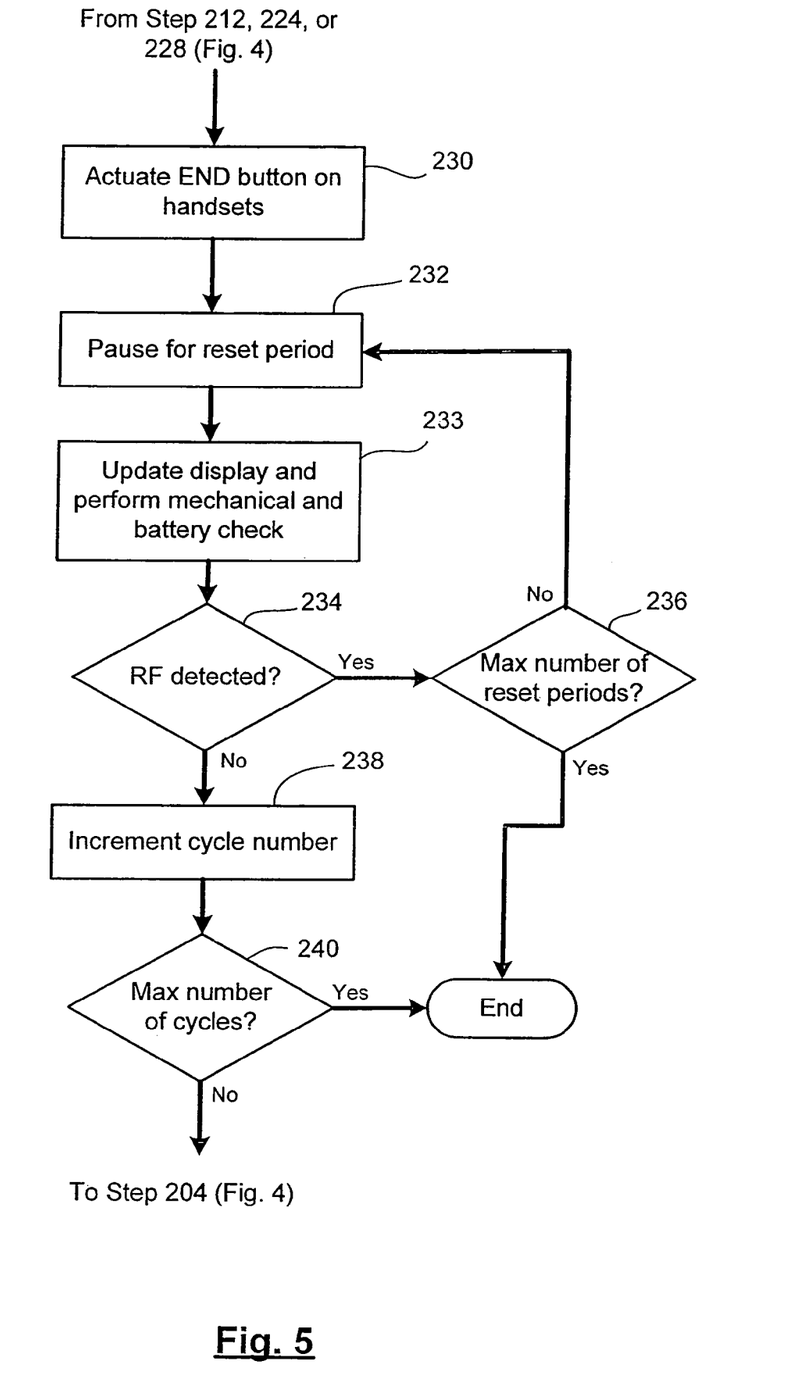

Reference is now made to FIGS. 4 and 5, which show, in flowchart form, an embodiment of a method 200 for testing wireless handsets. The method 200 relates to a test sequence involving a pair of handsets under test, one of which is designated to be a transmitting handset, the other being a receiving handset. The test sequence is performed in parallel with a benchmark pair of handsets.

The method 200 begins in step 202 with initialization and set-up. Various parameters may be altered or selected by a user through the user interface of the test system. For example, the user may specify the number of test cycles to be performed, the duration of the transmission window during which the system will attempt to detect an RF transmission related to an outgoing call request, the duration of the reception window during which the system will attempt to detect an RF transmission related to an incoming call request, the pulse length of a valid RF transmission, and various other parameters.

Once the system is set up and the user has completed customization of any parameters, the user may initiate the test sequence. The test sequence begins in step 204, where the system actuates the SEND buttons on the transmitting handset under-test and the transmitting benchmark handset. For simplicity, FIGS. 4 and 5 show the test sequence performed for a handset pair. It will be appreciated that the test sequence is performed in parallel for the handsets under-test and the benchmark handsets.

In step 206, the system begins an outgoing call request timer. This timer relates to a time period within which a call request should be detected to qualify as a successful call request. The time period may be adjustable by the user when initializing the system. In one embodiment, the outgoing transmission time period is set between 10 and 20 seconds. If a qualifying transmission is not detected within this time period, then the outgoing transmission is deemed a failure.

In step 208, the system looks for an indicator of an outgoing transmission. In particular, in this embodiment, the system attempts to locate a leading edge of an RF transmission from the transmitting handset. The RF sensor provides data, usually at a preselected sample rate. The data may be filtered in various ways to reduce noise and improve detection. In one embodiment, the RF levels are measured against a threshold. A transition to a level above the threshold is deemed a leading edge.

If a leading edge is detected, the method 200 continues in step 214. Otherwise, the system assesses whether the outgoing call request timer has reached the end of the outgoing transmission time period in step 210. If it has, then the transmission is recorded as a failure in step 212. The recording of transmission success or failures may be implemented using counters, memory fields, registers, or any other mechanism for recording and tracking data. If the time period has not expired, then the method 200 loops back to step 208 to continue looking for a leading edge.

In step 214, the system continues to monitor the RF detected to determine if the leading edge results in a pulse of RF transmission having a predefined duration or length. For example, a successful outgoing call request may be indicated by an outgoing RF transmission having a length of at least 5 seconds. If a transmission of this duration is detected, then the method continues to step 216. Otherwise, if the detected RF transmission is insufficient in duration or length, then the method returns to step 210 to continue monitoring the RF sensor for a qualifying transmission. In other words, in one embodiment, at step 214 the controller continues to sample the RF signal at period intervals to determine if an RF transmission is detected. Provided the samples continue to indicate that an RF transmission is occurring then the method 200 waits at step 214 until the threshold duration is reached. If the samples cease to indicate the presence of an RF transmission before the threshold duration is reached, then the method 200 goes to step 210 to look for the next leading edge.

At step 216, having detected an RF transmission from the transmitting handset meeting the predefined criteria, the call request is recorded as a success.

From step 216, the method 200 then tests whether the call request is successfully received by the receiving handset. In step 218, the system starts an incoming call request timer. The incoming call request timer provides a window of time within which the system attempts to detect RF transmissions from the receiving handset indicative of an incoming call request. The duration of the window may be adjustable by the user in setting the parameters for the system.

In step 220, the system looks for a leading edge in the RF signals sensed by the RF sensor at the receiving handset. If a leading edge is detected, then in step 222 the system assesses whether the detected RF transmission has a duration of at least a predefined threshold, such as, for example, 5 seconds. If so, then it meets the criteria for being considered part of the incoming call request handshake between the receiving handset and the basestation. As a result, a successful incoming call is recorded in step 224. As described above in connection with step 214, at step 222 the system continues sampling the RF signal to confirm that an RF transmission is detected until either the transmission ceases (step 226) or the predefined threshold duration is reached (step 224), whichever comes first.

The system continues to look for an RF transmission by the receiving handset having the predefined duration until one is found or until the incoming call request timer expires, as indicated in step 226. If the timer expires without detection of an RF transmission meeting the criteria, then in step 228 a failed incoming call request is recorded.

Steps 212, 228, and 224 each continue at step 230 (FIG. 5). In step 230, the END button is actuated on the transmitting handset. Actuation of the END button terminates the call. In particular, the transmitting handset sends the wireless network a message or signal indicating that it terminates the call request. The details of the message or signal may depend on the wireless communications protocol used.

The method 200 continues at step 232 where a pause occurs to allow the handsets to reset in response to the END command and enter a ready mode. The reset period selected may be sufficiently long to ensure that the call is fully terminated by the wireless network and to ensure that the handsets return to a state in which they are capable of sending and receiving a new call. During the reset period, in step 233, the system updates the output display and performs a mechanical failure check and/or low battery check. The system may perform other update, output or testing operations during the reset period, such as outputting data on a serial port.

After the reset period ends, in step 234 the system checks to see if any RF transmissions are emanating from the handsets, as detected by the RF sensors. If so, then another reset period is applied. In step 236 the system may assess whether a maximum number of reset periods have expired without cessation of the detected RF transmission. This may indicate a mechanical failure with respect to one of the handsets and the test sequence may be terminated. For example, it may indicate that the actuator is stuck on the autodialler, that a keypad button is stuck, or that a battery-low condition exists. There are other possible faults, as will be appreciated by those skilled in the art. In one embodiment, the reset period is about 40 seconds.

Provided that the RF transmissions cease, then the method 200 continues in step 238 where the number of test cycles performed is incremented. In step 240, the system assesses whether it has performed the complete set of desired test cycles. If so, it ends. Otherwise, it returns to step 204 to begin a new test cycle by placing the next call.

It will be appreciated that the embodiments of the method and system described above determine success or failure of incoming or outgoing call requests by determining whether a handset emanates RF transmission for a defined length of time. The system and method described does not evaluate the content of the transmission or confirm whether it conforms to a given wireless communication protocol. To maintain simplicity, the system and method described determine whether a threshold RF level transmission occurs for more than a predefined duration. Such a transmission is deemed to be indicative of an interaction with the wireless network that signifies successful outgoing or incoming call requests.

Figure 6:
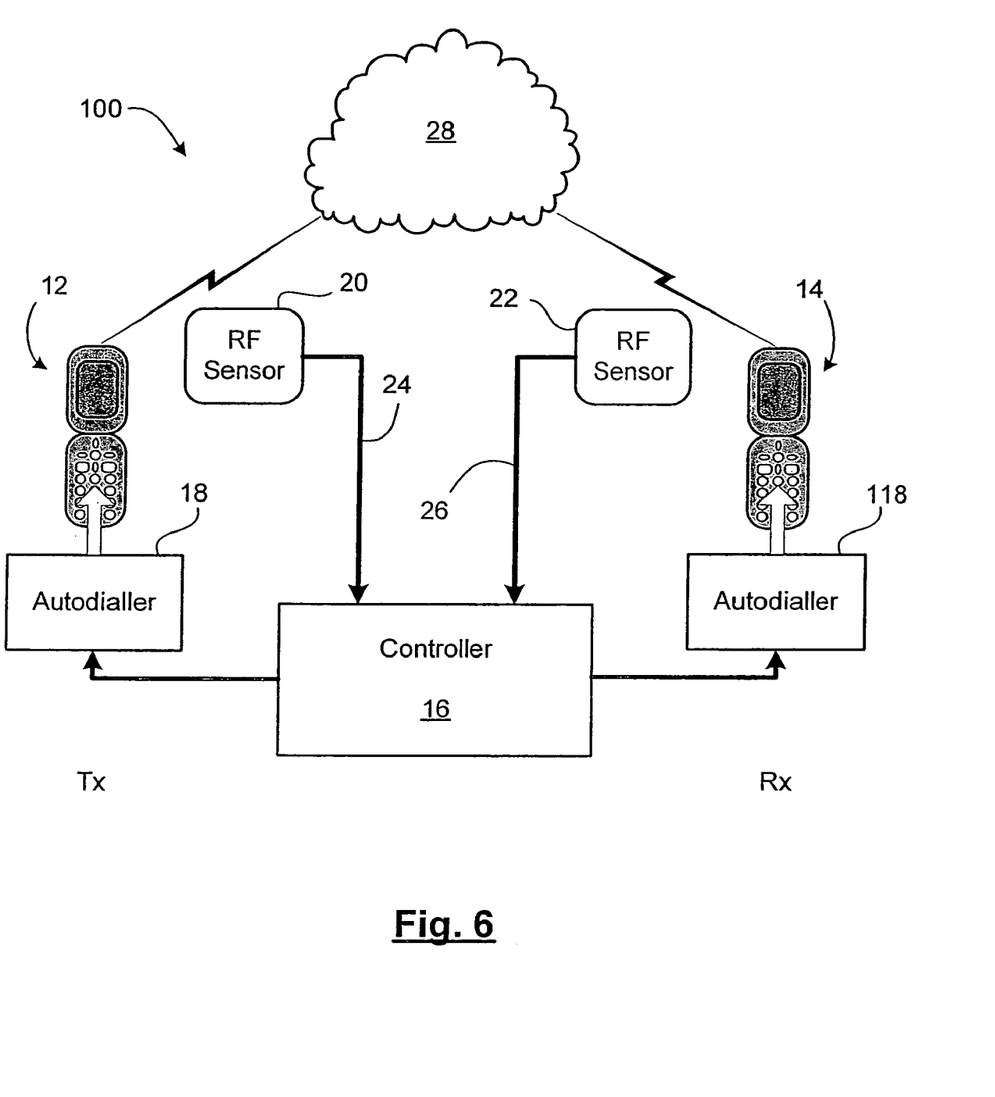
FIG. 6 shows a further embodiment of a test system for testing wireless devices.

Reference is now made to FIG. 6, which shows another embodiment of a test system 100 for testing wireless devices. For simplicity, this embodiment is shown in FIG. 6 without the benchmark testing components; however, it will be appreciated that those components may be included in other embodiments.

The test system 100 includes the components of the test system 10 shown in FIG. 1, but further includes a second autodialler 118 for actuating the test receive handset 14. The second autodialler 118 may be configured to cause the test receive handset 14 to accept an incoming call. For example, in a mechanical actuator embodiment, the second autodialler 118 may be configured to depress the TALK key or its equivalent so as to accept an incoming call. In this embodiment, the test receive handset 14 completes the call with the test transmit handset 12 and an active voice session is opened between the two handsets 12, 14 over the wireless network 28. The second autodialler 118 operates under the control of the controller 16.

By providing the second autodialler 118, additional testing may be performed. For example, the test system 10 described above in conjunction with FIG. 1 performed a "paging period" test to determine whether the incoming call paging process was taking place by determining whether the test receive handset 14 transmits RF signals having at least a predefined duration within a predefined period. When the TALK key is depressed, the test receive handset 14 enters a "conversation period" during which an active call is ongoing between the test receive handset 14 and the test transmit handset 12. Some defective handset may unexpectedly drop the call when the TALK key is depressed or shortly thereafter. Accordingly, one additional test that may be performed with the test system 100 of FIG. 6 is to monitor the RF signals transmitted by the test receive handset 14 for a predefined length of time to confirm that the call continues to be active. Unexpected cessation of the RF signals, or cessation for longer than a preset duration, may be deemed a failure or dropped call.

Another test that may be performed is an intraband handoff test. This test evaluates the ability of a dual-mode handset to switch an active call from one frequency band to another frequency band. On the North American wireless plan, the frequencies used for cellular communication include 1900 MHz and 850 MHz (as compared to the European bands of 900 MHz and 1800 MHz). Some wireless networks may have a "default" frequency that is used, such as, for example, 1900 MHz, and may also have the ability to instruct a handset to switch to another frequency band, such as, for example, 850 MHz. Accordingly, in such a network, the initial call may be established on the default band, like 1900 MHz, and the network may force the handsets to move the call to the 850 MHz band. This is intraband handoff of an active call.

To test this feature, the test system 100 monitors the call after the TALK button has been depressed. The wireless network 28 is configured to force the call to an alternative frequency band. The intraband handoff should, under normal operation, occur within the first few seconds of a call becoming active. Accordingly, the test system 100 monitors the RF signals emanating from the test receive handset 14 for a period of time after actuation of the TALK button to confirm that the call is not dropped during the intraband handoff. An unexpected cessation of RF signals, or cessation of signals for more than a preset period, may be deemed a failure or dropped call.

The second autodialler 118 may further be configured to depress an END button to terminate an active call on the test receive handset 14, thereby enabling the test sequence to begin anew.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A system for testing wireless mobile devices, one of the wireless mobile devices being designated a transmitting device, another wireless mobile device being designated a receiving device, the wireless mobile devices communicating via call requests through a wireless network having at least one basestation and communicating using a wireless communication protocol, the system comprising:
   an autodialer connected to the transmitting device for causing the transmitting device to initiate a call request to the receiving device through the at least one basestation in the wireless network;
   a first sensor for sensing RF signals emanating from the transmitting device and having an output port for providing a first signal based upon the RF signals sensed from the transmitting device;
   a second sensor for sensing RF signals emanating from the receiving device and having an output port for providing a second signal based upon the RF signals sensed from the receiving device; and
   a controller for controlling operation of said autodialler and coupled to the output ports of said first sensor and said second sensor to receive said first signal and said second signal, respectively, the controller including a test module for determining whether said call request is received by the receiving device from the at least one basestation in the wireless network,
   wherein said controller includes a processor and wherein said test module is executable by said processor for controlling the system in accordance with a test sequence;
   wherein said test module includes a component for determining whether said first signal indicates a successful outgoing call request and for determining whether said second signal indicates a successful incoming call request; and
   wherein said successful outgoing call request is indicated by an RF pulse having a duration greater than a first threshold and occurring within a predefined first time window.

2. The system claimed in claim 1, wherein said autodialler comprises a jig for holding the transmitting device and at least one actuator adjustably mounted to said jig, wherein said at least one actuator selectively depresses a button on the transmitting device.

3. The system claimed in claim 2, wherein said at least one actuator includes a servo, and wherein said controller outputs a control signal to said servo to control operation of said actuator.

4. The system claimed in claim 1, wherein said successful incoming call request is indicated by an RF pulse having a duration greater than a second threshold and occurring within a predefined second time window.

5. The system claimed in claim 1, further comprising
   a benchmark transmit handset,
   a benchmark receive handset,
   a second autodialler for causing said benchmark transmit handset to initiate a concurrent call request to said benchmark receive handset,
   a third sensor for sensing RF signals emanating from said benchmark transmit handset and having an output port for providing a first benchmark signal based upon the RF signals sensed from said benchmark transmit handset, and a fourth sensor for sensing RF signals emanating from said benchmark receive handset and having an output port for providing a second benchmark signal based upon the RF signals sensed from said benchmark receive handset, wherein said controller controls said second autodialler and receives said first benchmark signal and said second benchmark signal, and wherein said test module determines whether said concurrent call request is received by said benchmark receive handset.

6. The system claimed in claim 1, further including a second autodialler connected to the receiving device for causing the receiving device to accept a call request through the wireless network.

7. A method of testing wireless mobile devices, one of the wireless mobile devices being designated a transmitting device, another wireless mobile device being designated a receiving device, the wireless mobile devices communicating via call requests through a wireless network having at least one basestation and communicating using a wireless communication protocol, the method comprising the steps of:

initiating a call request from the transmitting device to the receiving device through the at least one basestation in the wireless network;

detecting first RF signals emanating from the transmitting device;

detecting second RF signals emanating from the receiving device; and determining from said first RF signals whether said call request is transmitted by the transmitting device and determining from said second RF signals whether said call request is received by the receiving device from the at least one basestation in the wireless network, wherein said step of detecting said first RF signals includes sensing RF levels proximate the transmitting handset and converting said RF levels into an electrical transmit signal, and wherein said step of determining whether said call request is transmitted includes analyzing said electrical transmit signal; and wherein said step of analyzing includes determining whether said electrical transmit signal contains a pulse having a duration greater than a threshold and occurring within a predefined time window.

8. The method claimed in claim 7, wherein said step of initiating includes outputting a control signal to activate an autodialler, wherein said autodialler causes said transmitting device to initiate said call request.

9. The method claimed in claim 8, wherein said autodialler comprises a jig for holding the transmitting device and a servo adjustably mounted to said jig, and wherein said step of initiating includes physically depressing a SEND key on the transmitting device in response to said control signal.

10. The method claimed in claim 9, further including steps of positioning the transmitting device in said jig and adjusting a position of said servo such that said servo depresses said SEND key when activated.

11. The method claimed in claim 7, wherein said steps are repeated for a selected number of cycles in an automated test sequence by a test system.

12. The method claimed in claim 7, wherein said method further comprises steps of:

initiating a concurrent call request from a benchmark transmit handset to a benchmark receive handset through the wireless network;

detecting third RF signals emanating from said benchmark transmit handset;

detecting fourth RF signals emanating from said benchmark receive handset; and determining from said third RF signals whether said concurrent call request is transmitted by the benchmark transmit handset and determining from said fourth RF signals whether said concurrent call request is received by the benchmark receive handset through the wireless network.

13. The method claimed in claim 7, further including steps of accepting the call request at the receiving device to establish an active call and determining from said second RF signals whether said active call remains active during a predefined conversation period.

14. A test system for testing wireless mobile devices, one of the wireless mobile devices being designated a transmitting device, another wireless mobile device being designated a receiving device, the wireless mobile devices communicating via call requests through a wireless network having at least one basestation and communicating using a wireless communication protocol, the system comprising:

means for initiating a call request from the transmitting device to the receiving device through the at least one basestation in the wireless network;

means for detecting first RF signals emanating from the transmitting device;

means for detecting second RF signals emanating from the receiving device; and means for determining from said first RF signals whether said call request is transmitted by the transmitting device and for determining from said second RF signals whether said call request is received by the receiving device from the at least one basestation in the wireless network, wherein said means for detecting said first RF signals includes means for sensing RF levels proximate the transmitting handset and converting said RF levels into an electrical transmit signal; and wherein said means for determining whether said call request is transmitted includes means for determining whether said electrical transmit signal contains a pulse having a duration greater than a threshold and occurring within a predefined time window.

15. The system claimed in claim 14, wherein said means for initiating include means for receiving a control signal and means for physically depressing a SEND key on the transmitting device in response to said control signal.

* * * * *